United States Patent
Hernandez Soto

(10) Patent No.: US 11,325,537 B2
(45) Date of Patent: May 10, 2022

(54) STORAGE SYSTEM FOR A VEHICLE

(71) Applicant: Ford Global Technologies, LLC, Dearborn, MI (US)

(72) Inventor: Moises Abraham Hernandez Soto, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/012,711

(22) Filed: Sep. 4, 2020

(65) Prior Publication Data

US 2022/0073005 A1 Mar. 10, 2022

(51) Int. Cl.
*B60R 7/04* (2006.01)
*B60N 2/30* (2006.01)
*B60N 2/42* (2006.01)

(52) U.S. Cl.
CPC .............. *B60R 7/043* (2013.01); *B60N 2/305* (2013.01); *B60N 2/4263* (2013.01); *B60N 2205/35* (2013.01)

(58) Field of Classification Search
CPC ...... B60N 2/305; B60N 2/3052; B60N 2/304; B60N 2/4263; B60N 2/3043; B60N 2/3045; B60N 2205/35; B60R 7/043; B60R 7/04; B60R 7/046
USPC ............................ 297/188.1, 188.09, 188.08
See application file for complete search history.

(56) References Cited

U.S. PATENT DOCUMENTS

| | | | |
|---|---|---|---|
| 5,902,009 A | 5/1999 | Singh | |
| 6,752,443 B1 | 6/2004 | Thompson | |
| 9,873,383 B1 * | 1/2018 | Mather | B60N 2/305 |
| 10,232,788 B1 * | 3/2019 | Hagedorn | B60R 7/043 |
| 2002/0005649 A1 * | 1/2002 | Hofmann | B60N 2/305 |
| | | | 296/37.15 |
| 2004/0056500 A1 * | 3/2004 | Kayumi | B60N 2/206 |
| | | | 296/37.15 |
| 2006/0181103 A1 * | 8/2006 | Khan | B60R 7/043 |
| | | | 296/37.14 |
| 2013/0082500 A1 * | 4/2013 | Line | B60N 2/305 |
| | | | 297/332 |
| 2015/0084386 A1 | 3/2015 | Hellman | |
| 2016/0046240 A1 * | 2/2016 | Lara sandoval | B60N 2/02 |
| | | | 297/188.13 |
| 2018/0265010 A1 | 9/2018 | Line | |
| 2018/0297533 A1 * | 10/2018 | Mozurkewich | B60N 2/4263 |
| 2019/0084487 A1 * | 3/2019 | Hagedorn | B60N 2/02 |

FOREIGN PATENT DOCUMENTS

| | | | |
|---|---|---|---|
| CN | 206107144 | * | 4/2017 |
| CN | 210680956 | * | 6/2020 |
| CN | 107709068 | * | 1/2021 |
| JP | 4225363 B2 | | 2/2009 |
| JP | 4940783 B2 | | 5/2012 |
| WO | WO2019029717 | * | 2/2019 |

* cited by examiner

*Primary Examiner* — Mark R Wendell

(74) *Attorney, Agent, or Firm* — Vichit Chea; Price Heneveld LLP

(57) ABSTRACT

A storage system for a vehicle includes a storage bin. The storage bin is positioned vehicle-downward of the seating assembly of said vehicle. A trim component overlies a door sill of said vehicle. The trim component and the storage bin together define an under-seat storage cavity. The trim component defines a side receptacle distinct from the under-seat storage cavity.

20 Claims, 9 Drawing Sheets

STORAGE SYSTEM FOR A VEHICLE

FIELD OF THE DISCLOSURE

The present disclosure generally relates to a storage system for a vehicle. More specifically, the present disclosure relates to a storage system for a vehicle that includes a storage bin and a trim component configured to define an under-seat storage cavity together with the storage bin.

BACKGROUND OF THE DISCLOSURE

Some vehicles include under-seat storage cavities. An under-seat storage cavity that is defined by a storage bin and a trim component that defines a distinct side receptacle may be desired.

SUMMARY OF THE DISCLOSURE

According to a first aspect of the present disclosure, a storage system for a vehicle includes a storage bin. The storage bin is positioned vehicle-downward of a seating assembly of said vehicle. A trim component overlies a door sill of said vehicle. The trim component and the storage bin together define an under-seat storage cavity. The trim component defines a side receptacle distinct from the under-seat storage cavity.

Embodiments of the first aspect of the present disclosure may include any one or a combination of the following features:
  the side receptacle is positioned vehicle-laterally-outboard of the seating assembly and vehicle-laterally-inboard of the door sill;
  the storage bin extends beneath the side receptacle;
  the trim component comprises a scuff plate portion configured to overlie the door sill, a first side wall that extends generally vehicle-downward from the scuff plate portion to a base, and a second side wall that extends generally vehicle-upward from the base, wherein the side receptacle is defined by the base and the first and second side walls;
  the second side wall extends from the base to a rim that at least partially defines an opening to the under-seat storage cavity;
  the second side wall is configured to define the under-seat storage cavity together with the storage bin;
  the trim component further comprises a front wall that extends generally vehicle-upward from the base between the first and second side walls, wherein the side receptacle is defined by the front wall together with the base and the first and second side walls;
  the trim component further comprises a shelf that extends generally vehicle-forward from the front wall, wherein the shelf is positioned vehicle-downward of the scuff plate portion;
  the storage bin defines an aperture configured to provide access to a battery of said vehicle; and
  a pocket feature coupled to an interior side wall of the storage bin proximate to an opening of the under-seat storage cavity and configured to receive a storage bin divider therein.

According to a second aspect of the present disclosure, a storage system for a vehicle includes a storage bin that is positioned vehicle-downward of a seating assembly of said vehicle. A trim component overlies a door sill of said vehicle and extends vehicle-laterally-inboard therefrom to define an under-seat storage cavity together with the storage bin.

Embodiments of the second aspect of the present disclosure may include any one or a combination of the following features:
  the trim component comprises a first side and a second side opposite the first side, wherein at least a portion of the second side defines the under-seat storage cavity together with the storage bin and the first side defines a side receptacle;
  a portion of the first side defines the under-seat storage cavity together with the storage bin;
  the trim component comprises a scuff plate portion configured to overlie the door sill, and a rim positioned vehicle-laterally-inboard of the scuff plate portion and configured to define at least a portion of an opening to the under-seat storage cavity; and
  the trim component further comprises a platform that extends generally vehicle-forward from the rim and defines a platform aperture configured to receive a locking feature for selectively maintaining the seating assembly in a use position.

According to third aspect of the present disclosure, a trim component for a vehicle includes a scuff plate portion and a rim. The scuff plate portion is configured to overlie a door sill of said vehicle. The rim is configured to be positioned vehicle-laterally-inboard of the scuff plate portion and define a portion of an opening to an under-seat storage cavity of said vehicle.

Embodiments of the third aspect of the present disclosure may include any one or a combination of the following features:
  a side receptacle is defined between the scuff plate portion and the rim;
  a first side wall that extends from the scuff plate portion to a base, and a second side wall that extends from the base to the rim, wherein the side receptacle is defined by the base and the first and second side walls, and wherein the base is configured to be positioned vehicle-downward of the scuff plate portion and the rim is configured to be positioned vehicle-upward of the base;
  a front wall that is positioned between the first and second side walls and that extends from the base to a shelf that extends outward from the front wall away from the side receptacle, wherein the shelf is configured to be positioned vehicle-upward of the base, to be positioned vehicle-downward of the scuff plate portion, and to extend generally vehicle-forward from the front wall; and
  a platform that extends outward from the rim, wherein the platform is configured to be positioned vehicle-forward of the rim and the shelf is configured to be positioned vehicle-downward of the platform between the platform and the scuff plate portion.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
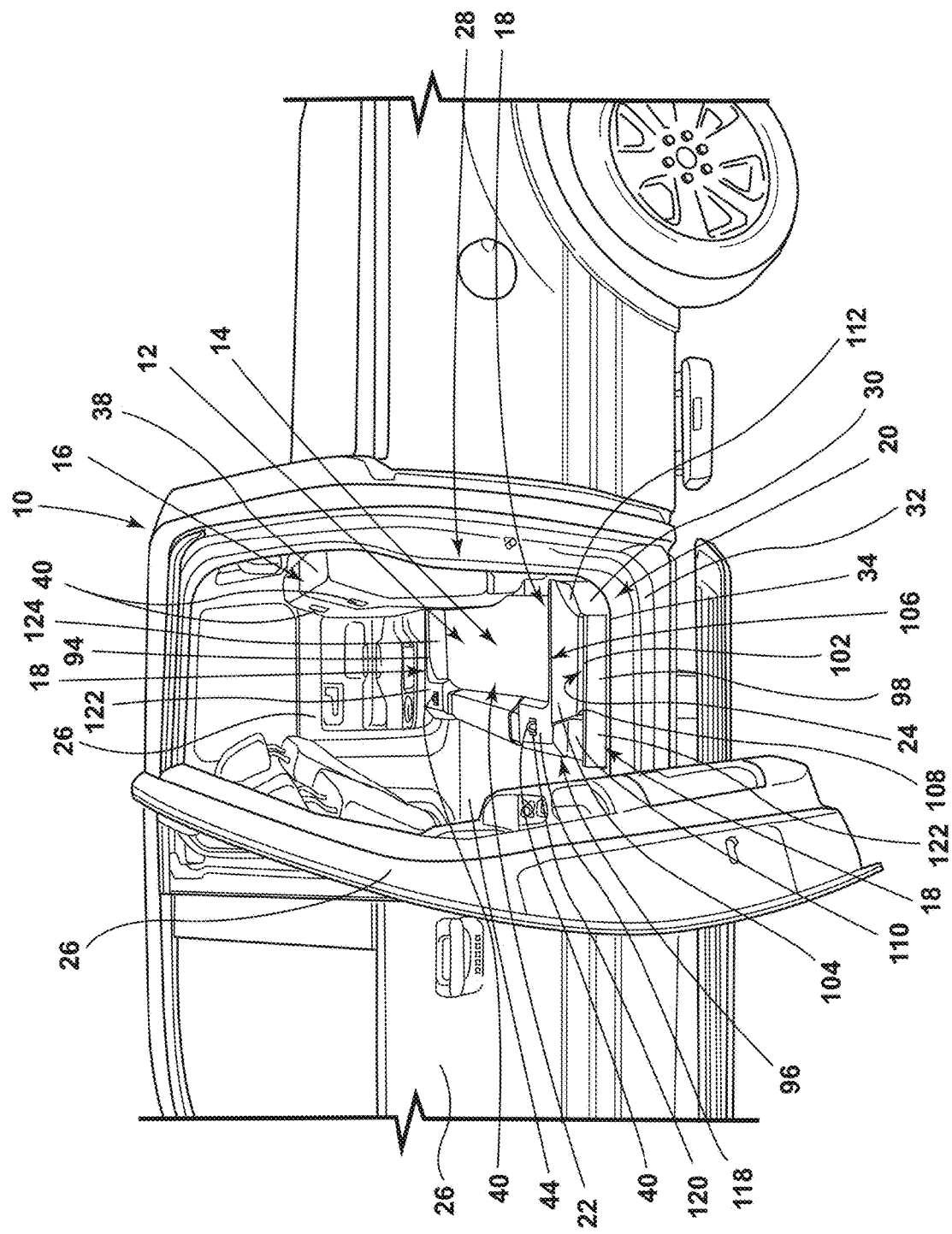
FIG. 1 is a side perspective view of a vehicle, illustrating a storage system within the vehicle, according to one embodiment.

In this document, relational terms, such as "first" and "second," "top" and "bottom," and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring now to FIGS. 1-9, a vehicle 10 includes a storage system 12. The storage system 12 includes a storage bin 14 that is positioned vehicle-downward of a seating assembly 16 of the vehicle 10. A trim component 18 overlies a door sill 20 of the vehicle 10. The trim component 18 and the storage bin 14 together define an under-seat storage cavity 22. The trim component 18 defines a side receptacle 24 that is distinct from the under-seat storage cavity 22.

Referring now to FIG. 1, the vehicle 10 includes a plurality of doors 26. Each of the plurality of doors 26 corresponds with a door frame 28 defined by the vehicle 10. The door frame 28 may include a door sill 20. As illustrated in FIG. 1, the door sill 20 includes an interior portion 30 and an exterior portion 32 positioned vehicle-laterally-outboard of the interior portion 30. In some implementations, the exterior portion 32 may be vehicle-downward and vehicle-laterally-outboard of the interior portion 30. In some examples, a door frame seal 34 may be disposed generally between the interior and exterior portions 30, 32 of the door sill 20.

Figure 2A:
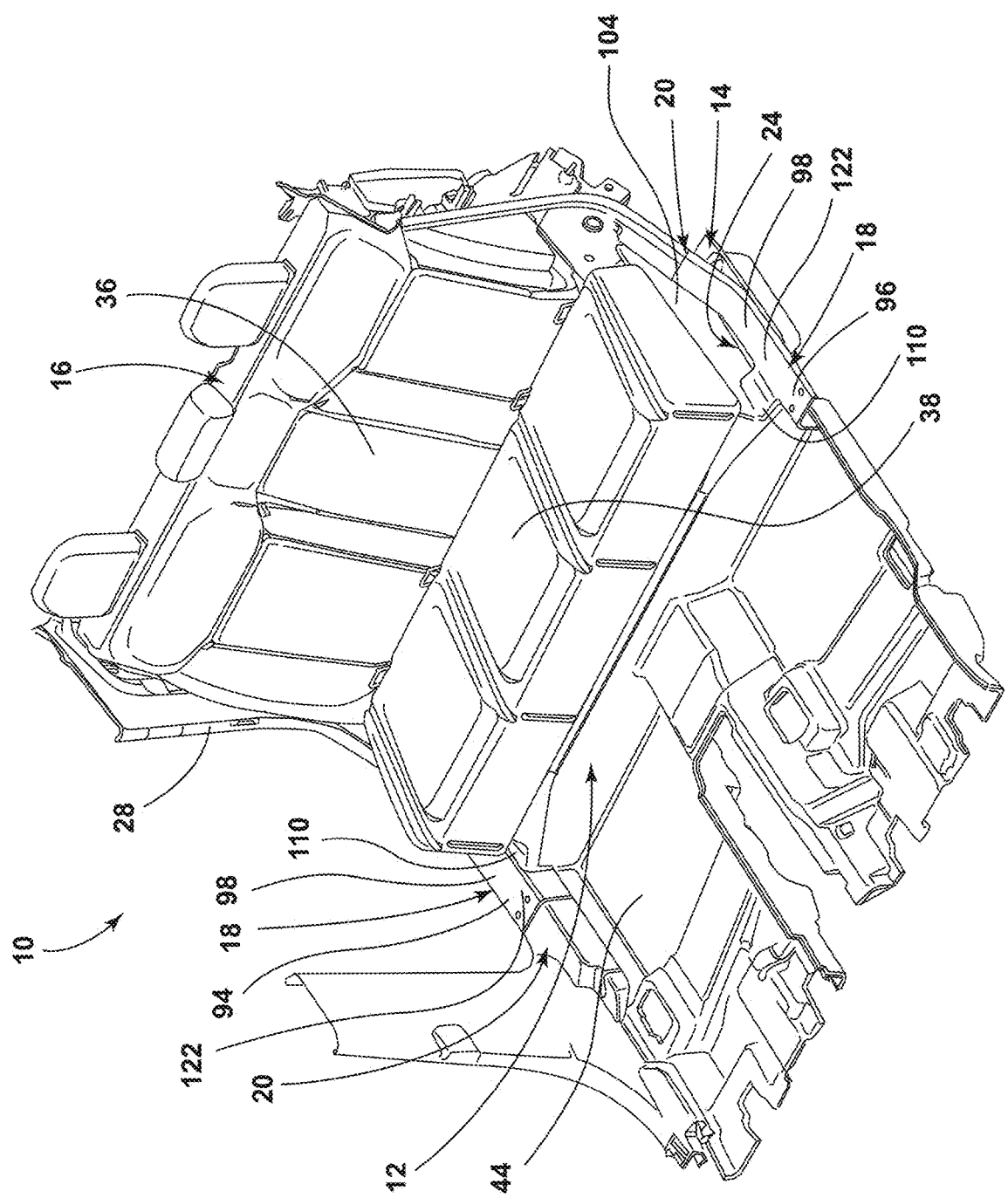
FIG. 2A is a top perspective view of an interior of the vehicle, illustrating a seating assembly with a bench-style seat base in a use position, such that an under-seat storage cavity is covered, according to one embodiment.
Figure 2B:
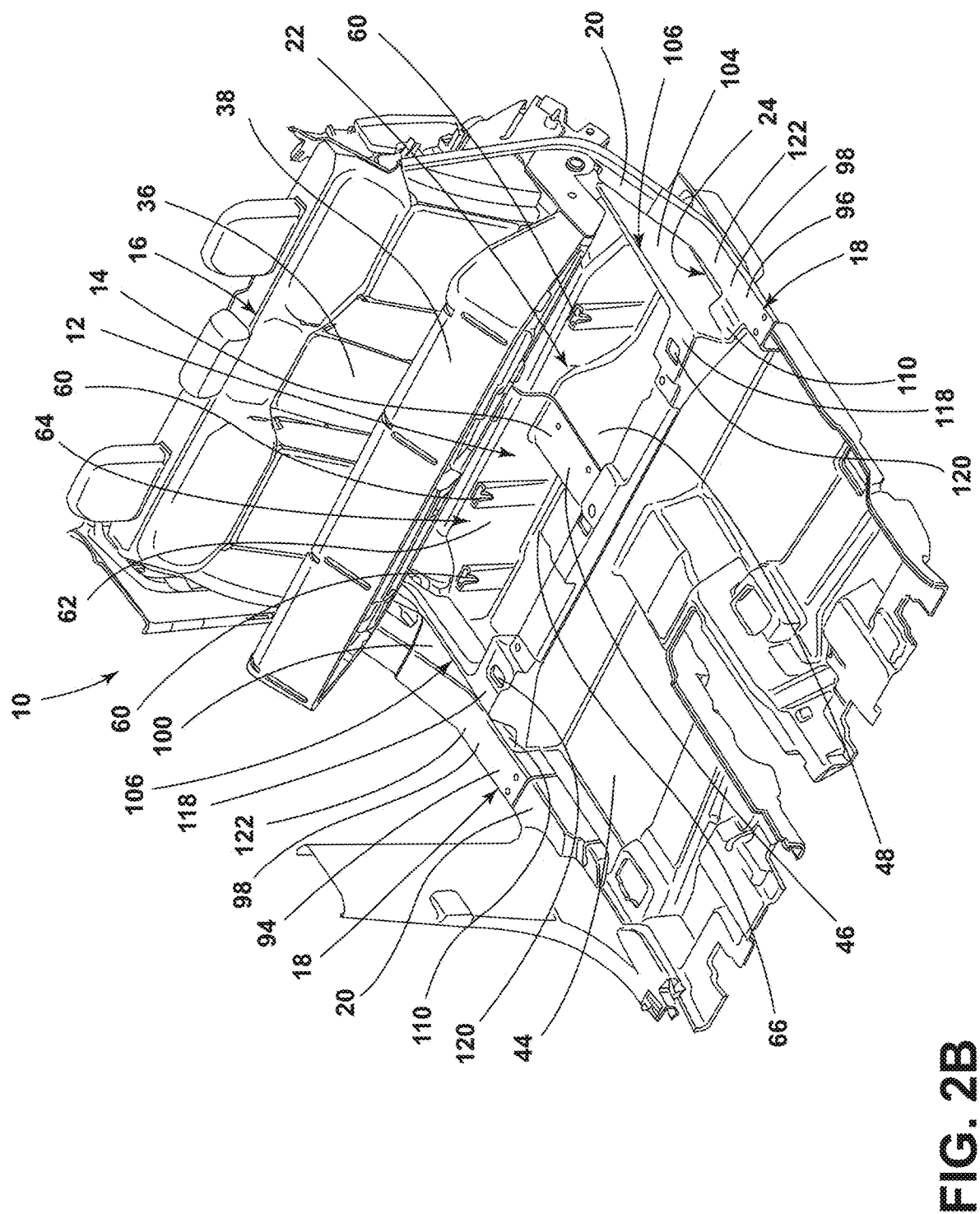
FIG. 2B is a top perspective view of the seating assembly of FIG. 2A, illustrating the seat base pivoted upward from the use position to a stowed position to reveal the under-seat storage cavity defined by a storage bin and first and second trim components, according to one embodiment.

Referring now to FIGS. 1-2B, the vehicle 10 includes the seating assembly 16. The seating assembly 16 includes a seatback 36 and a seat base 38. In the embodiment illustrated in FIGS. 1-2A, the seating assembly 16 is a bench-style seating assembly having a seat base 38 and a seatback 36 configured to accommodate three vehicle occupants. The seat base 38 may be operable to move between a use position and a stowed position. For example, as illustrated in FIGS. 1-2B, the bench-style seat base 38 is configured to pivot relative to the seatback 36 vehicle-upward and vehicle-rearward from the use position, illustrated in FIG. 2A, to the stowed position, illustrated in FIGS. 1 and 2B. The seat base 38 of the seating assembly 16 may be configured to be selectively maintained in the use position by a locking feature 40. The locking feature 40 may be coupled to seat base 38 and may be configured to be engaged with a corresponding locking feature 40 coupled to the vehicle 10. Alternatively, the locking feature 40 may be coupled to the vehicle 10 and may be configured to be engaged with a corresponding locking feature 40 coupled to the seat base 38. A variety of types of locking features 40 are contemplated. Additionally, various types of seating assemblies 16 are contemplated. Further, it is contemplated that the seat base 38 of the seating assembly 16 may move between the use and stowed positions in a variety of manners, in various implementations.

Referring now to FIGS. 1-4, the vehicle 10 includes the storage system 12. The storage system 12 includes the under-seat storage cavity 22. The under-seat storage cavity 22 is disposed vehicle-downward of the seating assembly 16. As illustrated in FIGS. 2A-4, the under-seat storage cavity 22 is disposed beneath the seat base 38 of the seating assembly 16. A user may access the under-seat storage cavity 22 by moving the seat base 38 of the seating assembly 16 from the use position to the stowed position, as illustrated in FIGS. 2A and 2B. The under-seat storage cavity 22 is configured for receiving items to be stored beneath the seat base 38 of the seating assembly 16. In some implementations, the under-seat storage cavity 22 may be defined by a floor 44 of the vehicle 10. In various examples, the under-seat storage cavity 22 may be defined by the storage bin 14 and/or the trim component 18, as described further herein.

As illustrated in FIGS. 2B-4, the storage system 12 includes the storage bin 14. In the illustrated embodiments, the storage bin 14 is disposed vehicle-downward of the seating assembly 16 and defines the under-seat storage cavity 22. In some implementations, the storage bin 14 may include a plurality of distinct components that together comprise the storage bin 14. For example, the storage bin 14 may include a first bin component 46 that defines a first portion of the under-seat storage cavity 22 and a second bin component 48 coupled to the first bin component 46 that defines a second portion of the under-seat storage cavity 22.

Figure 3:
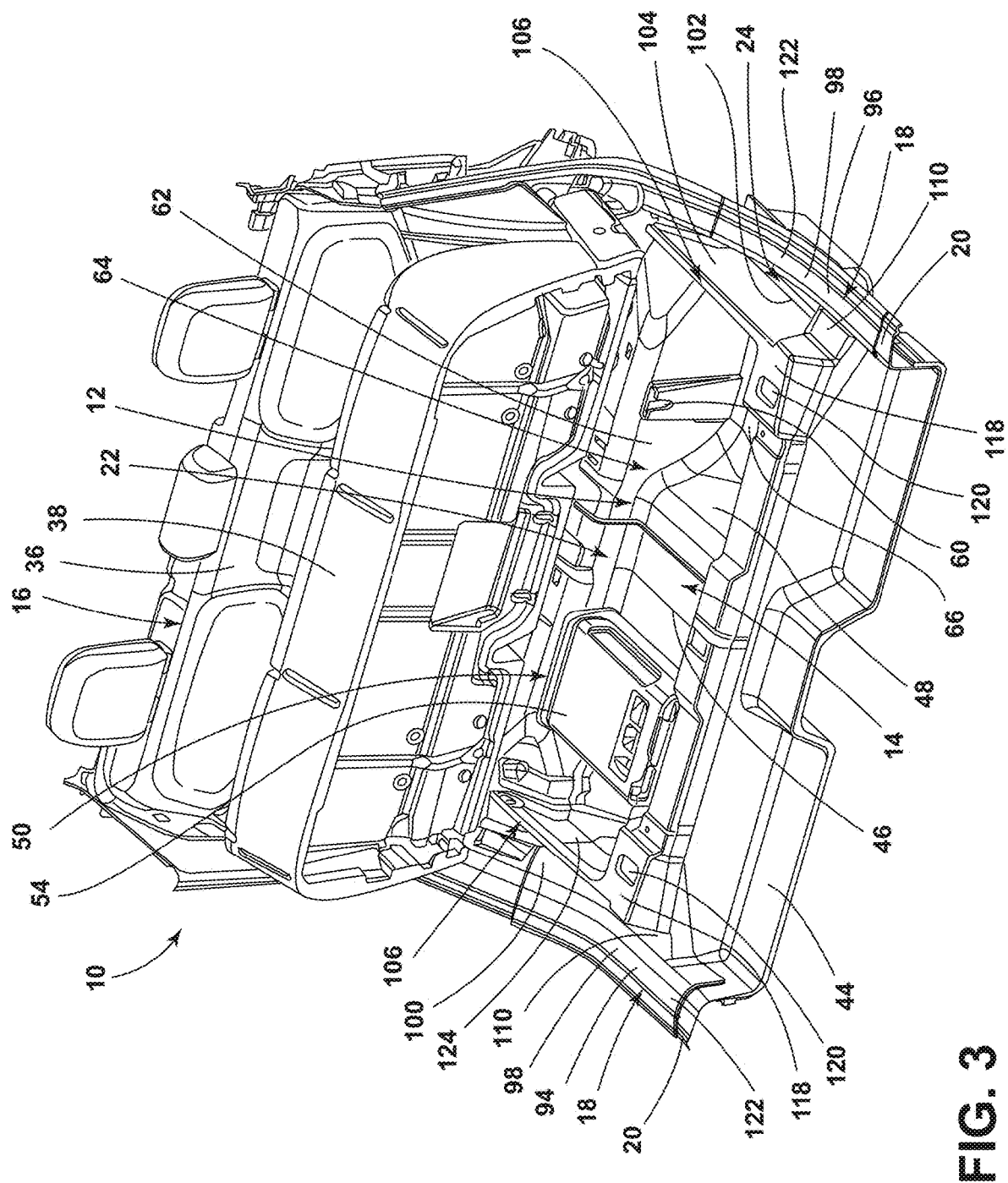
FIG. 3 is a top perspective view of a storage bin of the present disclosure, illustrating a lid covering an aperture defined by the storage bin that is configured to provide access to a battery of the vehicle, according to one embodiment.
Figure 4:
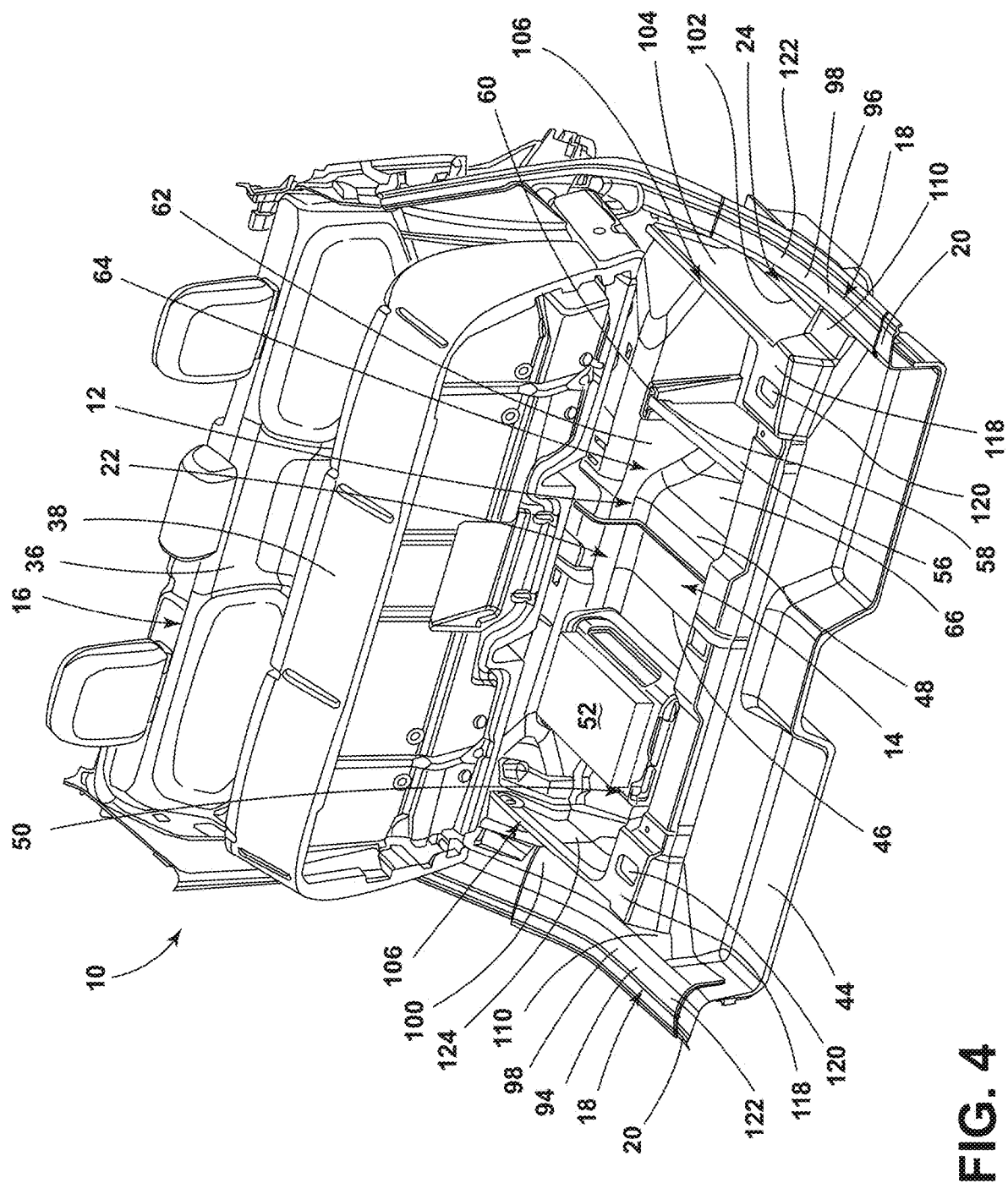
FIG. 4 is a top perspective view of a storage bin of the present disclosure, illustrating the aperture defined by the storage bin, the battery within the aperture, and a storage bin divider coupled to a pocket feature on an interior side wall of the storage bin, according to one embodiment.

Referring now to FIGS. 3 and 4, in some examples, the storage bin 14 may define an aperture 50 that is configured to provide access to a battery 52 of the vehicle 10. A removable and/or openable lid 54 may be operable to selectively cover the aperture 50. For example, in the embodiment illustrated in FIGS. 3 and 4, the lid 54 is operable to selectively cover the aperture 50 defined by the first bin component 46 of the storage bin 14 by moving between an assembled condition, wherein the lid 54 is coupled to the first bin component 46 and covers the aperture 50, as illustrated in FIG. 3, and a removed condition, wherein the lid 54 is removed from the first bin component 46 to allow access to the battery 52 through the aperture 50, as illustrated in FIG. 4. The aperture 50 in the storage bin 14 may be particularly advantageous in a hybrid vehicle, as a user may access and perform maintenance on the battery 52 of the hybrid vehicle from within the vehicle interior through the aperture 50. Further, the storage bin 14 having distinct first and second bin components 46, 48 may be advantageous, as the design of one of the first and second bin components 46, 48 may remain the same while the design of the other changes to form various types of storage bins 14. For example, the second bin component 48 illustrated in FIG. 2B is the same as the second bin component 48 illustrated in FIGS. 3 and 4 despite the first bin component 46 lacking the aperture 50 in the embodiment illustrated in FIG. 2B and defining the aperture 50 in the embodiment illustrated in FIGS. 3 and 4. Manufacturing costs may decrease and manufacturing efficiency may increase as a result.

Figure 5:
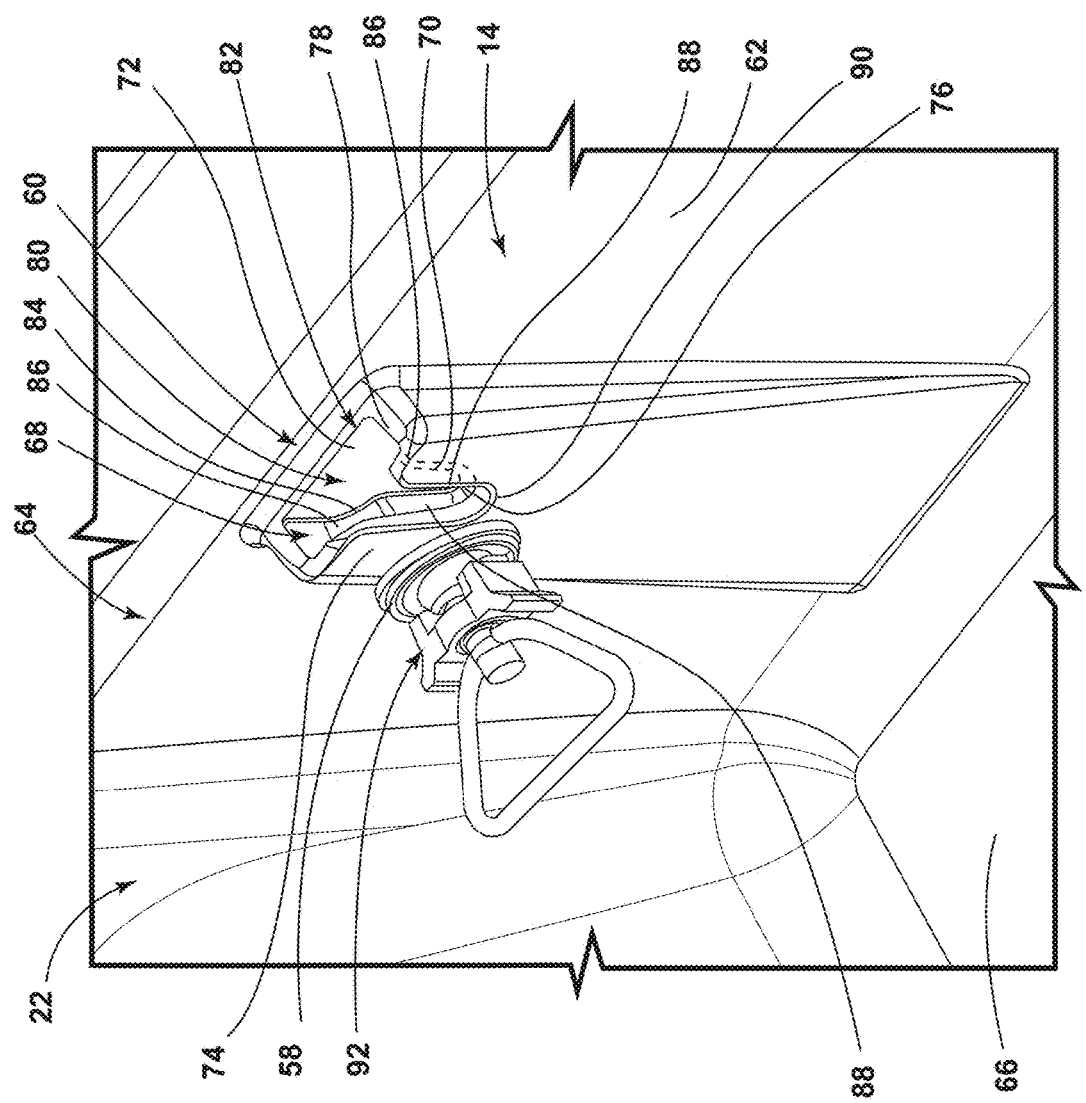
FIG. 5 is a top perspective view of the pocket feature of the storage bin, illustrating a pop-socket feature configured to engage with the pocket feature, according to one embodiment.

Referring now to FIGS. 3-5, a variety of components may be coupled to the storage bin 14 within the under-seat storage cavity 22. For example, as illustrated in FIG. 4, a storage bin divider 56 is coupled to the storage bin 14 and divides the under-seat storage cavity 22 into storage areas. The storage bin divider 56 is coupled to the storage bin 14 via engagement between an attachment feature 58 of the storage bin divider 56 and a pocket feature 60 coupled to an interior wall 62 of the storage bin 14. As illustrated in FIG. 5, the pocket feature 60 is proximate to an opening 64 of the under-seat storage cavity 22. In other words, the pocket feature 60 is nearer to the opening 64 of the under-seat storage cavity 22 than a bottom 66 of the under-seat storage cavity 22 defined by the storage bin 14. In some implementations, the pocket feature 60 may be integrally coupled with the storage bin 14. For example, the storage bin 14 and the pocket feature 60 may be integrally formed, such that the storage bin 14 and the pocket feature 60 are a single unitary body.

In the embodiment illustrated in FIG. 5, the pocket feature 60 includes a first side portion 68, a second side portion 70 opposite the first side portion 68, a rear portion 72 extending between the first and second side portions 68, 70, and a front portion 74 extending between the first and second side portions 68, 70 opposite the rear portion 72. The front portion 74, rear portion 72, and first and second side portions 68, 70 extend from a floor 76 to an upper lip 78 and define a recess 80. The upper lip 78 defines an opening 82 to the recess 80. Inner surfaces 84 of the first and second side portions 68, 70 include generally semi-circular upper portions 86 that begin at the upper lip 78, extend generally toward each other, and terminate between the portions of the upper lip 78 that extend along the first and second side portions 68, 70 and the floor 76. Generally planar lower portions 88 extend generally parallel to each other from the upper portions 86 to the floor 76 of the pocket feature 60. The recess 80 is wider between the upper portions 86 and narrower between the lower portions 88. The portion of the upper lip 78 that extends along the front portion 74 of the pocket feature 60 includes a generally U-shaped section 90 that swoops downward toward the floor 76 of the pocket feature 60.

The shape of the pocket feature 60 may advantageously enable reception of a variety of types of attachment features 58, so that a variety of components may be coupled to the storage bin 14 via the pocket feature 60. For example, the area of the recess 80 between the lower portions 88 of the inner surfaces 84 of the first and second side portions 68, 70 may be configured to securely receive the attachment feature 58 of the storage bin divider 56, as illustrated in FIG. 4, while the area of the recess 80 between the upper portions 86 may be configured to receive the wider, circular attachment feature 58 of a pop-socket 92 illustrated in FIG. 5.

Figure 8:
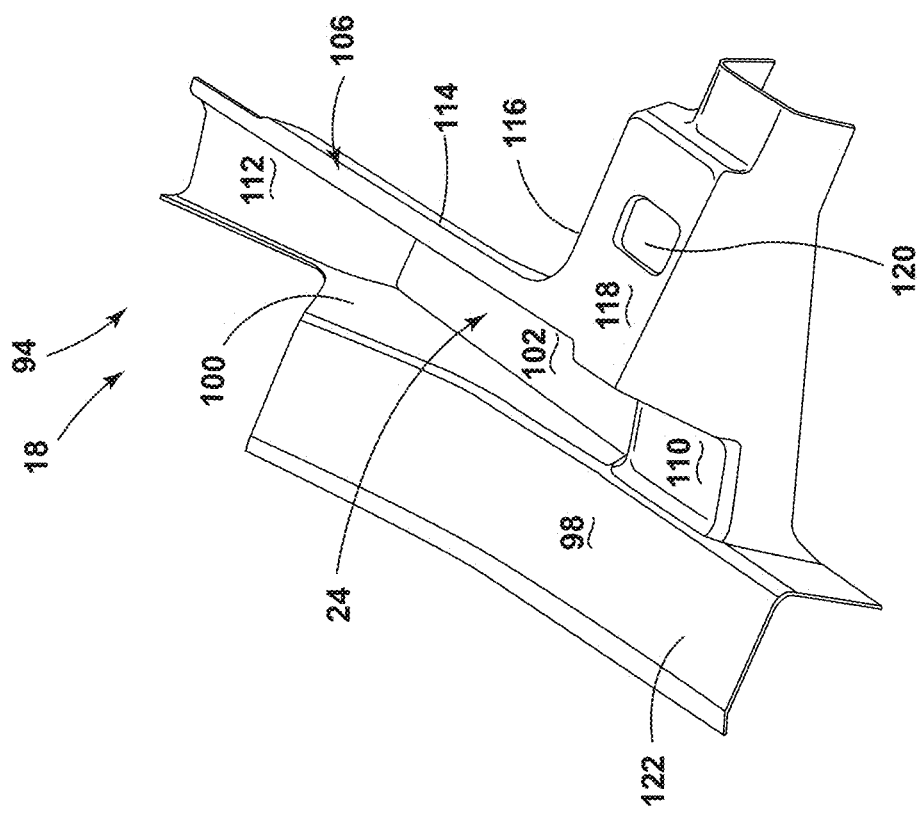
FIG. 8 is a top perspective view of the first trim component, illustrating the scuff plate portion, the side receptacle, and the rim, according to one embodiment.
Figure 9:
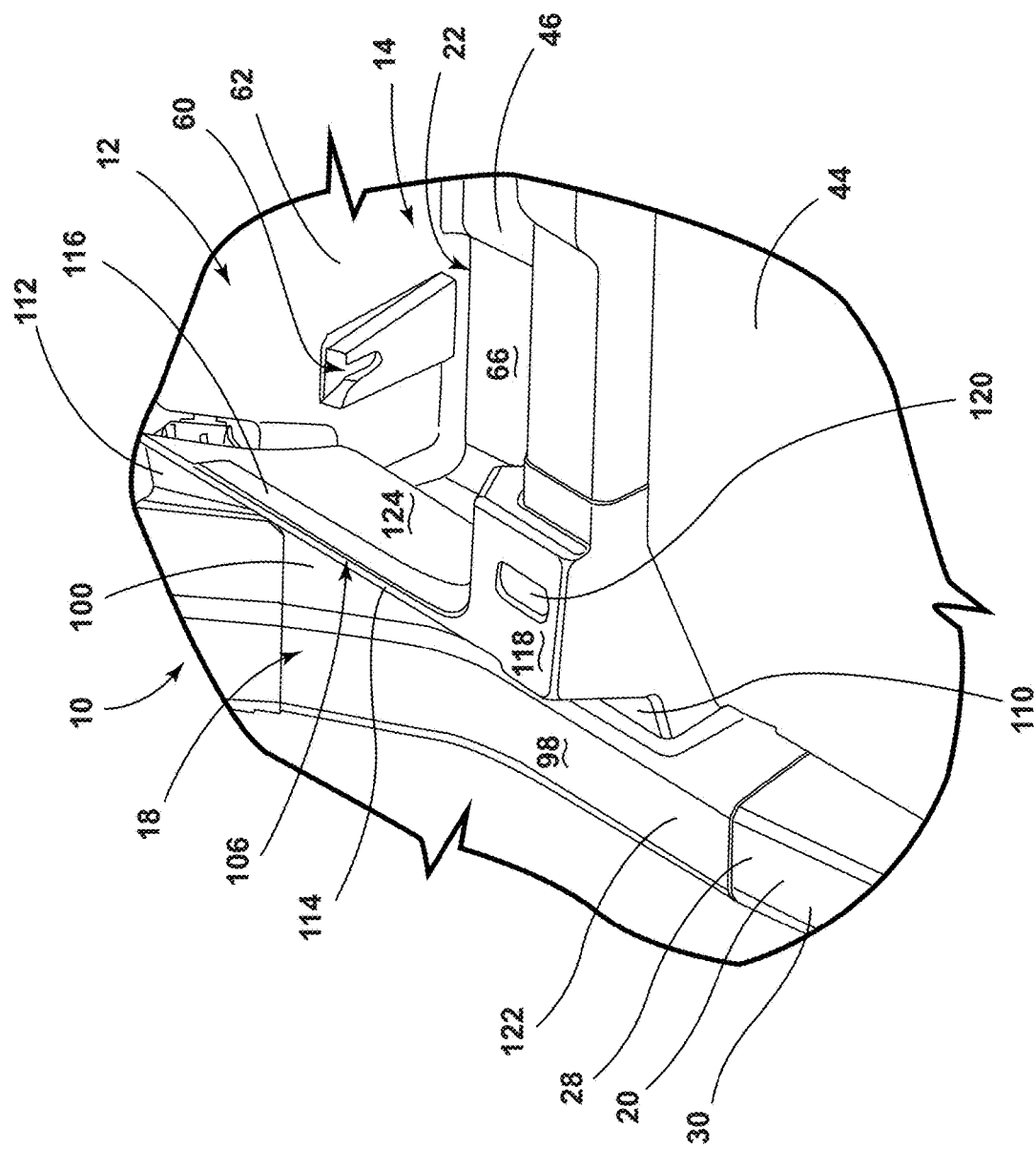
FIG. 9 is a top perspective view of the trim component and the storage bin, illustrating a portion of the storage bin extending beneath a portion of the first trim component that defines the side receptacle, according to one embodiment.

Referring now to FIGS. 1-4 and 6-9, the storage system 12 includes the trim component 18. The storage system 12 illustrated in FIGS. 1-4 includes a first trim component 94 and a second trim component 96. In the embodiments illustrated in FIGS. 2A-4, the first trim component 94 is coupled to the first bin component 46 of the storage bin 14 and the second trim component 96 is coupled to the second bin component 48 of the storage bin 14. As illustrated, the first and second trim components 94, 96 are disposed on opposite vehicle-lateral sides of the storage bin 14. The trim component 18 may be configured to overlie the door sill 20 of the vehicle 10, define the side receptacle 24 that is distinct from the under-seat storage cavity 22, and/or define the under-seat storage cavity 22. In some implementations, the trim component 18 may be configured to define the under-seat storage cavity 22 together with the storage bin 14. Further, as illustrated in FIG. 9, the trim component 18 may overlie the door sill 20 of the vehicle 10 and extend vehicle-laterally-inboard therefrom to define the under-seat storage cavity 22 together with the storage bin 14.

Figure 6:
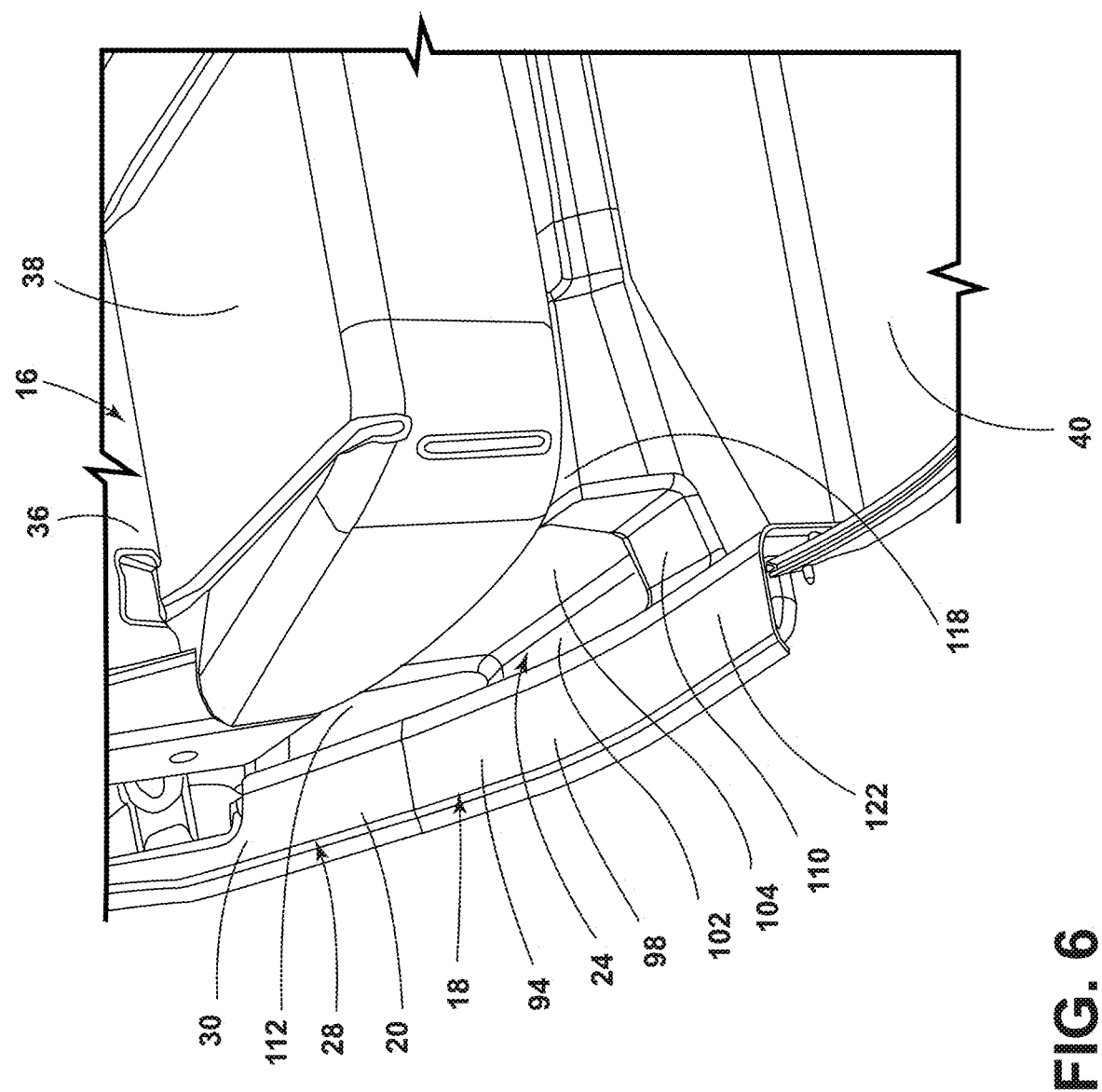
FIG. 6 is a top perspective view of a portion of the interior of the vehicle, illustrating the first trim component overlying a door sill of the vehicle and extending vehicle-inboard toward the seat base, which is in the use position, according to one embodiment.

In the embodiment of the trim component 18 illustrated in FIGS. 6-9, the trim component 18 includes a scuff plate portion 98. The scuff plate portion 98 is configured to overlie the door sill 20 of the vehicle 10, as illustrated in FIGS. 6 and 9. In some implementations, the scuff plate portion 98 may be configured to overlie the interior portion 30 of the door sill 20, the exterior portion 32 of the door sill 20, and/or a combination thereof. In some examples, the trim component 18 may be configured to overlie a portion of the door frame seal 34. Further, in some examples, the trim component 18 may be configured to be positioned vehicle-laterally-inboard of the door frame seal 34. The scuff plate portion 98 may be configured to conceal at least a portion of the door sill 20. For example, as illustrated in FIG. 9, the scuff plate portion 98 extends over a portion of the interior portion 30 of the door sill 20, such that the portion of the interior portion 30 is concealed by the scuff plate portion 98.

Referring still to the embodiment of the trim component 18 illustrated in FIGS. 6-9, the trim component 18 includes a first side wall 100 that extends from the scuff plate portion 98 to a base 102 of the trim component 18. As illustrated in FIG. 9, the first side wall 100 is configured to extend generally vehicle-downward from the scuff plate portion 98 to the base 102. The base 102 extends to a second side wall 104 of the trim component 18 that is opposite the first side wall 100. As illustrated in FIG. 6, the base 102 is configured to extend generally vehicle-laterally-inboard from the first side wall 100 to the second side wall 104. The second side wall 104 extends away from the base 102 to a rim 106 of the trim component 18. The second side wall 104 is configured to extend generally vehicle-upward from the base 102 to the rim 106.

Figure 7:
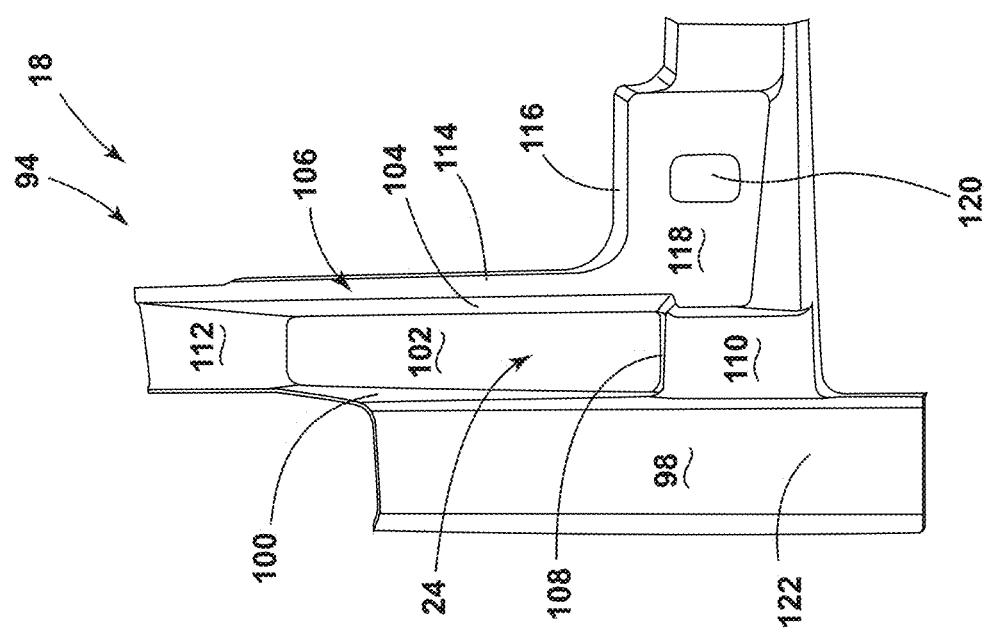
FIG. 7 is a plan view of the first trim component, illustrating a scuff plate portion, a side receptacle, and a rim, according to one embodiment.

As illustrated in FIGS. 7 and 8, the trim component 18 includes a front wall 108 that extends between the first and second side walls 100, 104 and that extends from the base 102 to a shelf 110. The front wall 108 is configured to extend generally vehicle-laterally-inboard from the first side wall 100 to the second side wall 104 and is configured to extend generally vehicle-upward from the base 102 to the shelf 110, as illustrated in FIG. 1. The trim component 18 includes a rear wall 112 that extends outward from the base 102 between the first and second side walls 100, 104 opposite the front wall 108. As illustrated in FIGS. 1 and 6, the rear wall 112 is configured to extend generally vehicle-upward and generally vehicle-rearward from the base 102 of the trim component 18.

In some implementations, the side receptacle 24 of the trim component 18 is defined by the first and second side walls 100, 104, the front and rear walls 108, 112, and the base 102, as illustrated in FIGS. 7 and 8. Further in various examples, the side receptacle 24 is distinct from the under-seat storage cavity 22, as illustrated in FIG. 1. In other words, the side receptacle 24 is not configured to be accessed through the opening 64 to the under-seat storage cavity 22. As illustrated in FIGS. 7 and 8, the side receptacle 24 is positioned between the scuff plate portion 98 and the rim 106. In some implementations, a portion of the under-seat storage cavity 22 extends beneath the side receptacle 24. In other words, a portion of the under-seat storage cavity 22 is positioned directly vehicle-downward of at least a portion of the side receptacle 24 defined by the trim component 18. In the embodiment illustrated in FIG. 9, a portion of the storage bin 14 configured to define the under-seat storage cavity 22 extends beneath the side receptacle 24 defined by the trim component 18.

In the embodiment of the trim component 18 illustrated in FIGS. 6-9, the rim 106 of the trim component 18 includes a top portion 114 and an interior side portion 116. As illustrated in FIG. 9, the top portion 114 is configured to extend generally vehicle-laterally-inboard from the second side wall 104 to the interior side portion 116, which extends generally vehicle-downward from the top portion 114. A platform 118 extends outward from the rim 106. As illustrated in FIG. 9, the platform 118 is configured to extend generally vehicle-forward and vehicle-laterally-inboard from the top portion 114 of the rim 106. As illustrated in FIG. 7, the interior side portion 116 of the rim 106 turns and extends generally vehicle-laterally-inboard along the platform 118. The rim 106 may be configured to define at least a portion of the opening 64 to the under-seat storage cavity 22. For example, in the embodiment illustrated in FIG. 9, a portion of the opening 64 to the under-seat storage cavity 22 is defined by the portions of rim 106 where the top portion 114 meets the interior side portion 116 and where the interior side portion 116 meets the platform 118.

As illustrated in FIGS. 1 and 6-9, the platform 118 defines a platform aperture 120. The platform aperture 120 may be configured to receive the locking feature 40 to selectively maintain the seating assembly 16 in the use position. For example, the locking feature 40 may be configured to extend through the platform aperture 120, as illustrated in FIG. 1. As illustrated in FIG. 9, the platform 118 is configured to be positioned vehicle-forward of the rim 106, and vehicle-upward of the shelf 110. The shelf 110 of the trim component 18 extends outward from the front wall 108 and away from the side receptacle 24. As illustrated in FIGS. 1 and 6, the shelf 110 is configured to extend generally vehicle-forward from the front wall 108. Further, the shelf 110 is configured to be positioned vehicle-upward of the base 102, vehicle-downward of the scuff plate portion 98, and vehicle-downward of the platform 118.

Referring now to FIG. 9, the trim component 18 includes a first side 122 and a second side 124 opposite the first side 122. The first side 122 of the trim component 18 may be the side of the trim component 18 that is visible within the vehicle interior outside of the under-seat storage cavity 22. In the embodiment illustrated in FIG. 9, the first side 122 of the trim component 18 defines the side receptacle 24. The second side 124 of the trim component 18 is in contact with the door sill 20 of the vehicle 10. In some implementations, the first side 122 and/or the second side 124 of the trim component 18 may define a portion of the under-seat storage cavity 22. For example, as illustrated in FIG. 9, the second side 124 of the portion of the trim component 18 that forms the second side wall 104 defines the under-seat storage cavity 22 together with the storage bin 14, and the first side 122 of the portion of the trim component 18 that forms the interior side portion 116 of the rim 106 defines a portion of the under-seat storage cavity 22 together with the storage bin 14. In some embodiments, the trim component 18 may be integrally formed as a single unitary body. For example, the scuff plate portion 98, the first side wall 100, the base 102, the second side wall 104, the rim 106, the front wall 108, the shelf 110, the rear wall 112, and/or the platform 118 may be integrally coupled.

The storage system 12 of the present disclosure may provide a variety of advantages. For example, the trim component 18 extending from the scuff plate portion 98 to at least the rim 106 may aid in preventing loose items from falling into the under-seat storage cavity 22 when the seating assembly 16 is in the use position. Additionally, the side receptacle 24 defined by the trim component 18 may provide an additional storage area outside of the under-seat storage cavity 22 for intentional item storage. Further, the side receptacle 24 may conveniently catch loose items that fall between the seat base 38 of the seating assembly 16 and the door sill 20 of the vehicle 10.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members.

Such joining may include members being integrally formed as a single unitary body with one another (i.e., integrally coupled) or may refer to joining of two components. Such joining may be permanent in nature, or may be removable or releasable in nature, unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

What is claimed is:

1. A vehicle, comprising:
    a door sill;
    a seating assembly;
    a storage bin positioned vehicle-downward of the seating assembly; and
    a trim component that overlies the door sill, wherein the trim component and the storage bin together define an under-seat storage cavity, and further wherein the trim component defines a side receptacle distinct from the under-seat storage cavity.

2. The vehicle of claim 1, wherein the side receptacle is positioned vehicle-laterally-outboard of the seating assembly and vehicle-laterally-inboard of the door sill.

3. The vehicle of claim 1, wherein the storage bin extends beneath the side receptacle.

4. The vehicle of claim 1, wherein the trim component comprises:
    a scuff plate portion configured to overlie the door sill;
    a first side wall that extends generally vehicle-downward from the scuff plate portion to a base; and
    a second side wall that extends generally vehicle-upward from the base, wherein the side receptacle is defined by the base and the first and second side walls.

5. The vehicle of claim 4, wherein the second side wall extends from the base to a rim that at least partially defines an opening to the under-seat storage cavity.

6. The vehicle of claim 4, wherein the second side wall is configured to define the under-seat storage cavity together with the storage bin.

7. The vehicle of claim 4, wherein the trim component further comprises:
    a front wall that extends generally vehicle-upward from the base between the first and second side walls, wherein the side receptacle is defined by the front wall together with the base and the first and second side walls.

8. The vehicle of claim 7, wherein the trim component further comprises:
    a shelf that extends generally vehicle-forward from the front wall, wherein the shelf is positioned vehicle-downward of the scuff plate portion.

9. The vehicle of claim 1, wherein the storage bin defines an aperture configured to provide access to a battery.

10. The vehicle of claim 1, further comprising:
    a pocket feature coupled to an interior side wall of the storage bin proximate to an opening of the under-seat storage cavity and configured to receive a storage bin divider therein.

11. A vehicle, comprising:
    a door sill;
    a seating assembly;
    a storage bin positioned vehicle-downward of the seating assembly; and
    a trim component that overlies the door sill and extends vehicle-laterally-inboard therefrom to define an under-seat storage cavity together with the storage bin.

12. The vehicle of claim 11, wherein the trim component comprises:
    a first side; and
    a second side opposite the first side, wherein at least a portion of the second side defines the under-seat storage cavity together with the storage bin and the first side defines a side receptacle.

13. The vehicle of claim 12, wherein a portion of the first side defines the under-seat storage cavity together with the storage bin.

14. The vehicle of claim 11, wherein the trim component comprises:
    a scuff plate portion configured to overlie the door sill; and
    a rim positioned vehicle-laterally-inboard of the scuff plate portion and configured to define at least a portion of an opening to the under-seat storage cavity.

15. The vehicle of claim 14, wherein the trim component further comprises:
    a platform that extends generally vehicle-forward from the rim and defines a platform aperture configured to receive a locking feature for selectively maintaining the seating assembly in a use position.

16. A trim component for a vehicle, comprising:
    a scuff plate portion configured to contactingly overlie a door sill of said vehicle; and
    a rim configured to be positioned vehicle-laterally-inboard of the scuff plate portion and define a portion of an opening to an under-seat storage cavity of said vehicle.

17. The trim component of claim 16, wherein a side receptacle is defined between the scuff plate portion and the rim.

18. The trim component of claim 17, further comprising:
    a first side wall that extends from the scuff plate portion to a base; and
    a second side wall that extends from the base to the rim, wherein the side receptacle is defined by the base and the first and second side walls, and wherein the base is configured to be positioned vehicle-downward off the scuff plate portion and the rim is configured to be positioned vehicle-upward of the base.

19. The trim component of claim 18, further comprising:
a front wall that is positioned between the first and second side walls and that extends from the base to a shelf that extends outward from the front wall away from the side receptacle, wherein the shelf is configured to be positioned vehicle-upward of the base, to be positioned vehicle-downward of the scuff plate portion, and to extend generally vehicle-forward from the front wall.

20. The trim component of claim 19, further comprising:
a platform that extends outward from the rim, wherein the platform is configured to be positioned vehicle-forward of the rim, and the shelf is configured to be positioned vehicle-downward of the platform between the platform and the scuff plate portion.

* * * * *